United States Patent
Tanaka

(10) Patent No.: US 11,016,036 B2
(45) Date of Patent: May 25, 2021

(54) REFLECTED LIGHT MEASUREMENT DEVICE

(71) Applicant: OPT GATE CO., LTD., Tokyo (JP)

(72) Inventor: Masayuki Tanaka, Tokyo (JP)

(73) Assignee: OPT GATE CO., LTD., Tokyo (JP)

( * ) Notice: Subject to any disclaimer, the term of this patent is extended or adjusted under 35 U.S.C. 154(b) by 0 days.

(21) Appl. No.: 16/652,118

(22) PCT Filed: Apr. 2, 2019

(86) PCT No.: PCT/JP2019/014662
§ 371 (c)(1),
(2) Date: Mar. 30, 2020

(87) PCT Pub. No.: WO2019/194188
PCT Pub. Date: Oct. 10, 2019

(65) Prior Publication Data
US 2020/0249177 A1  Aug. 6, 2020

(30) Foreign Application Priority Data

Apr. 3, 2018  (JP) .............................. JP2018-071716
Sep. 10, 2018 (JP) .............................. JP2018-169029

(51) Int. Cl.
*G01N 21/958* (2006.01)
*G01N 21/552* (2014.01)
(Continued)

(52) U.S. Cl.
CPC .......... *G01N 21/958* (2013.01); *G01M 11/02* (2013.01); *G01M 11/31* (2013.01); *G01N 21/552* (2013.01);
(Continued)

(58) Field of Classification Search
CPC .............. G01B 9/0209; G01B 9/02028; G01B 2290/35; G01B 2290/40;
(Continued)

(56) References Cited

U.S. PATENT DOCUMENTS 5,291,267 A * 3/1994 Sorin ..................... G01D 5/266
356/479
5,321,501 A * 6/1994 Swanson ............ A61B 1/00096
250/227.27
(Continued)

FOREIGN PATENT DOCUMENTS

JP          H04231837 A     8/1992
JP           05172694 A  *  7/1993
(Continued)

OTHER PUBLICATIONS

WIPO, International Search Report dated Jun. 3, 2019.

*Primary Examiner* — Gordon J Stock, Jr.
(74) *Attorney, Agent, or Firm* — Li & Cai Intellectual Property (USA) Office

(57) ABSTRACT

To provide a reflected light measurement device capable of efficiently performing disconnection inspection on an optical connector, and a plurality of optical fibers. The reflected light measurement device 1 includes a laser light source 2, a beam splitter 3 that branches measurement laser light L into measurement laser light L1 to be transmitted and reference laser light L2 to be reflected, a reference mirror 4 including an optical path length varying mechanism capable of adjusting an optical path length of the reference laser light L2, an optical path length switching unit 5, and switches the optical path length of the reference laser light L2 to a plurality of fixed lengths, and a photometer 6 that receives measurement laser light L1' reflected at defect sites D1 and (Continued)

D2 such as disconnection inside connectors C1 and C2, and reference laser light L2' reflected by the reference mirror 4.

12 Claims, 10 Drawing Sheets

(51) Int. Cl.
*G01M 11/00* (2006.01)
*G01M 11/02* (2006.01)
*G02B 6/38* (2006.01)
*G01N 21/95* (2006.01)

(52) U.S. Cl.
CPC .......... *G02B 6/385* (2013.01); *G01B 2290/35* (2013.01); *G01B 2290/40* (2013.01); *G01N 2021/9511* (2013.01); *G01N 2201/0636* (2013.01); *G01N 2201/0668* (2013.01); *G01N 2201/06113* (2013.01); *G01N 2201/127* (2013.01)

(58) Field of Classification Search
CPC ..... G01N 2021/9511; G01N 2201/127; G01N 2201/0668; G01N 2201/0636; G01N 2201/06113; G01N 21/552; G01N 21/958; G02B 6/385; G01M 11/02; G01M 11/0207; G01M 11/0242; G01M 11/0271; G01M 11/0278; G01M 11/30; G01M 11/31; G01M 11/3109; G01M 11/3118; G01M 11/3127; G01M 11/3136; G01M 11/3145; G01M 11/3154
USPC .............. 356/73.1, 124, 600, 601, 612, 445, 356/239.1–239.8
See application file for complete search history.

(56) References Cited

U.S. PATENT DOCUMENTS

| | | | | |
|---|---|---|---|---|
| 5,341,205 | A | * | 8/1994 | McLandrich ...... G01B 11/0675 356/479 |
| 5,365,335 | A | * | 11/1994 | Sorin ................. G01M 11/3172 250/227.19 |
| 9,644,944 | B2 | * | 5/2017 | Saitoh ................ G01B 9/02091 |
| 2012/0062870 | A1 | * | 3/2012 | Yamawaku ......... G01B 9/02025 356/51 |
| 2014/0226148 | A1 | | 8/2014 | Lane et al. |

FOREIGN PATENT DOCUMENTS

| | | | |
|---|---|---|---|
| JP | 06026984 A | * | 2/1994 |
| JP | 06207883 A | * | 7/1994 |
| JP | H07190886 A | | 7/1995 |
| JP | 2018009799 A | | 1/2018 |
| WO | WO 2014123596 A2 | | 8/2014 |

\* cited by examiner

[Fig.1]
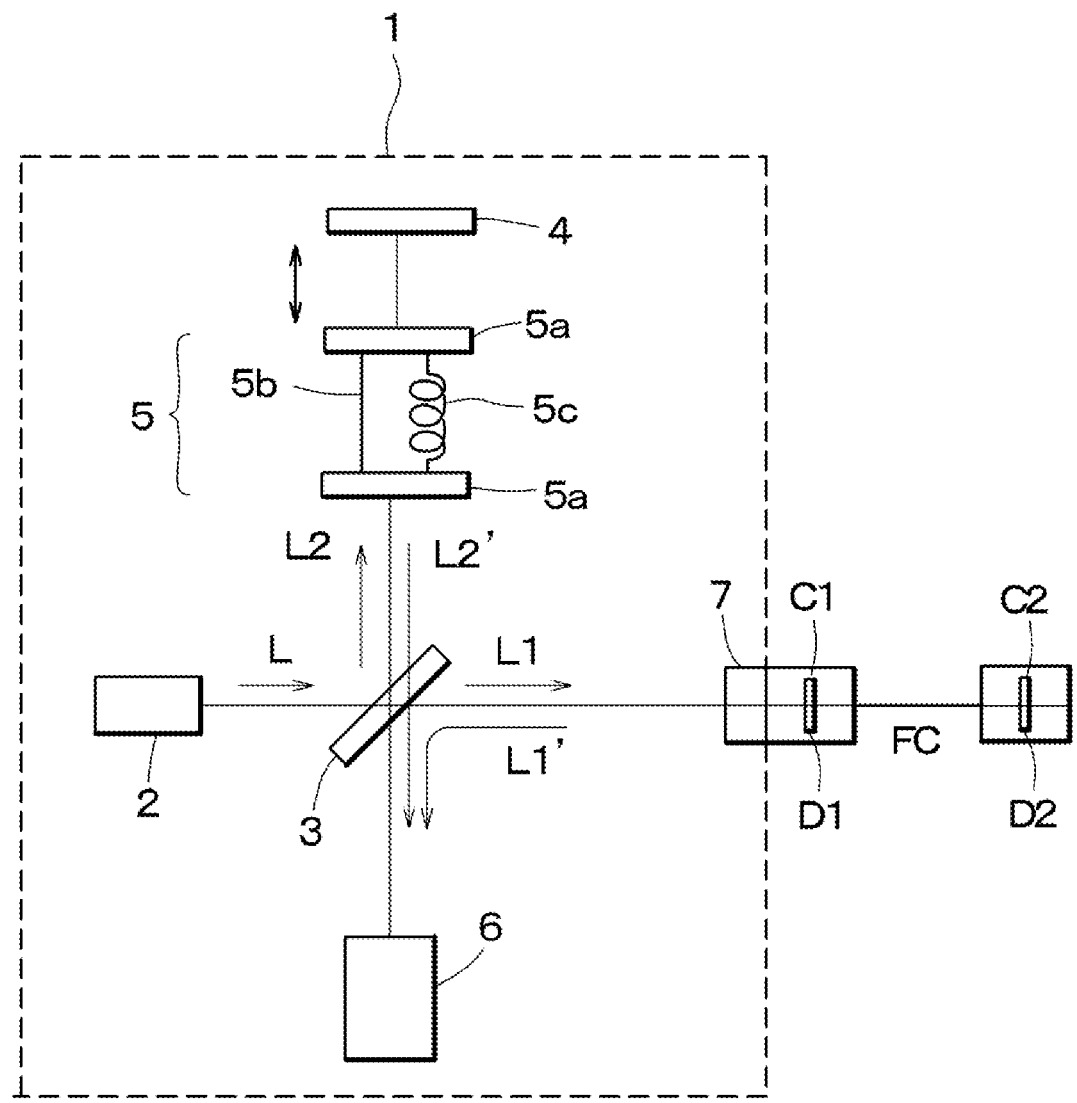

[Fig.2]
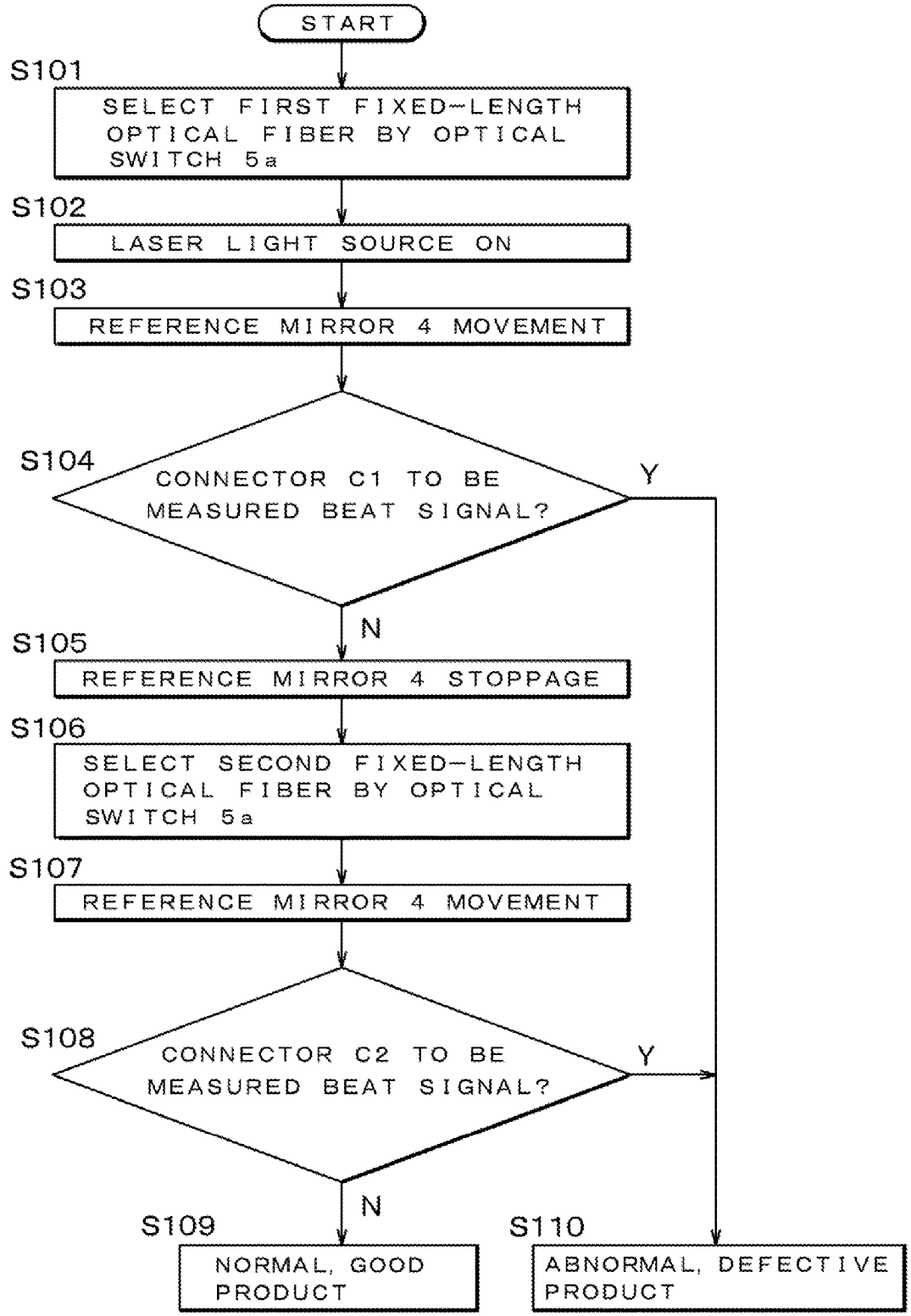

[Fig.3]
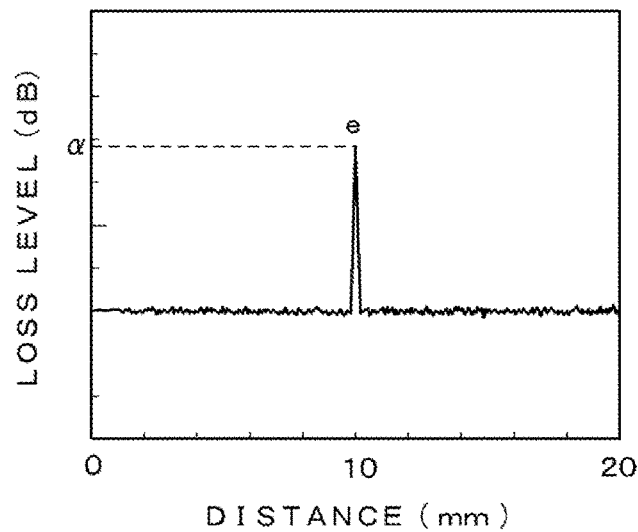
[Fig.4]
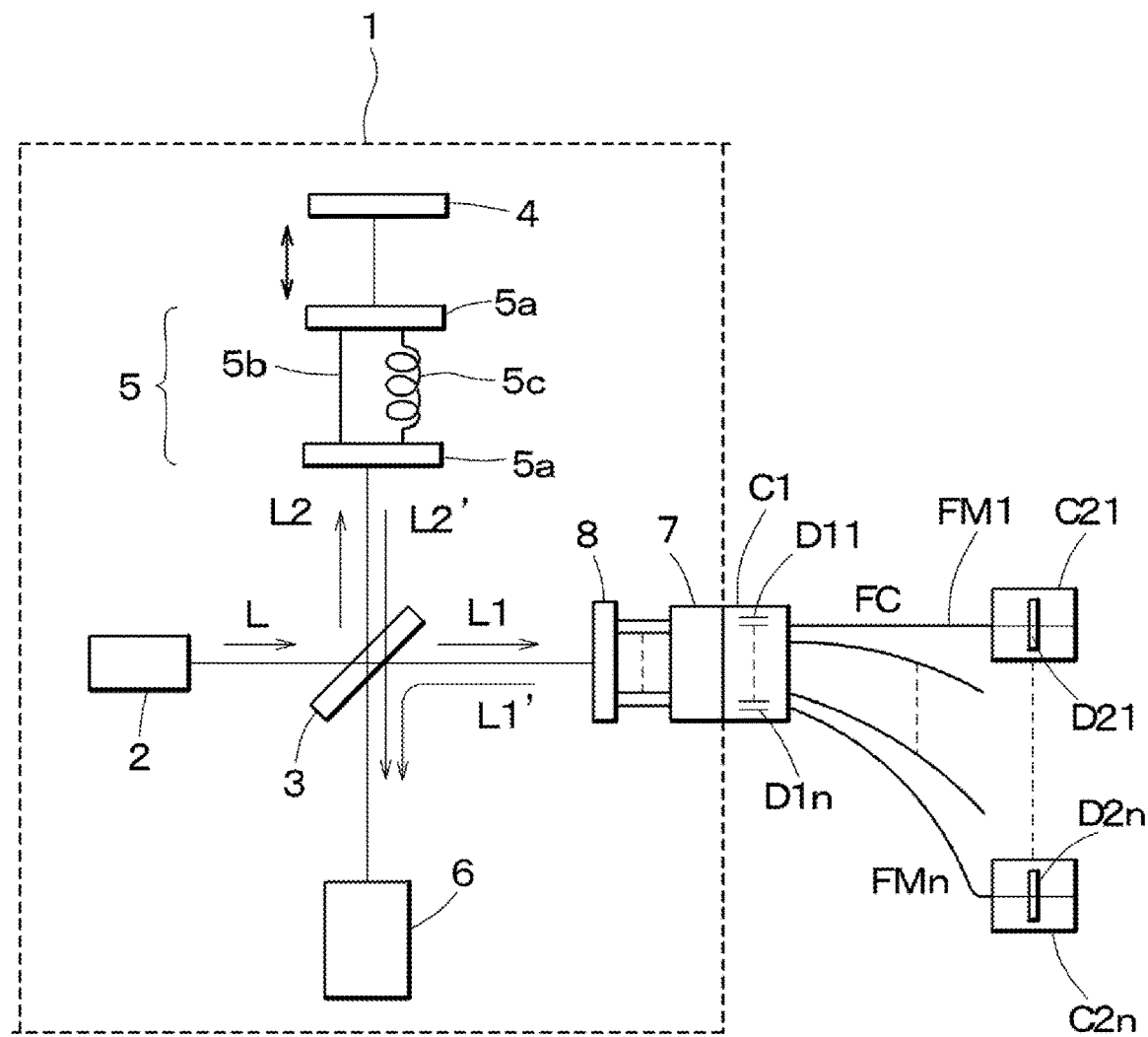

[Fig.5]
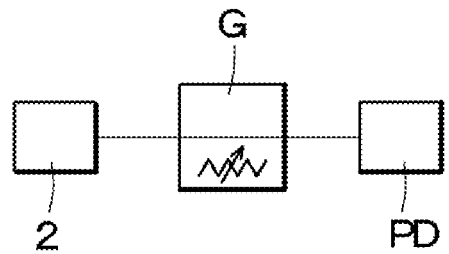
[Fig.6]
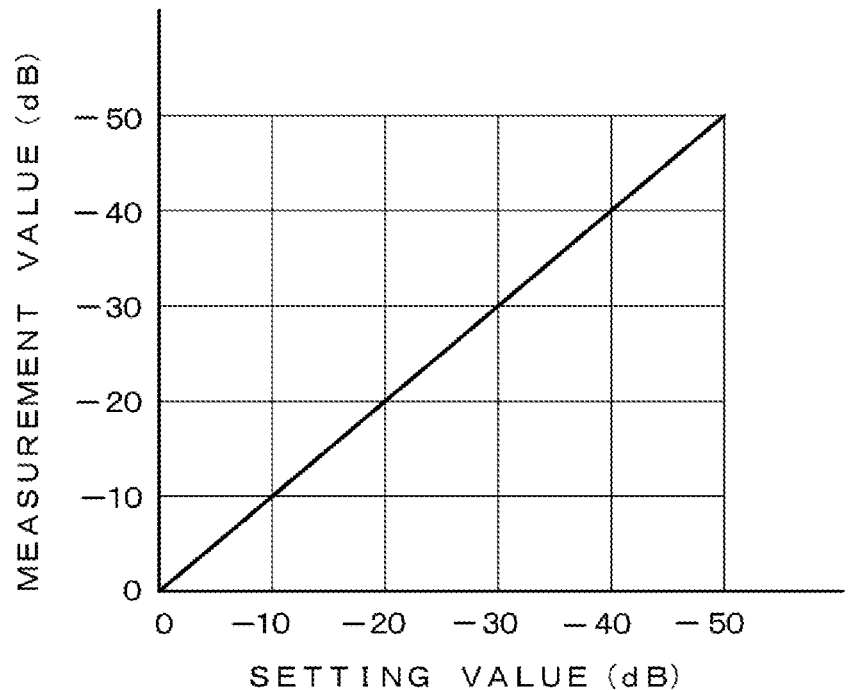
[Fig.7]
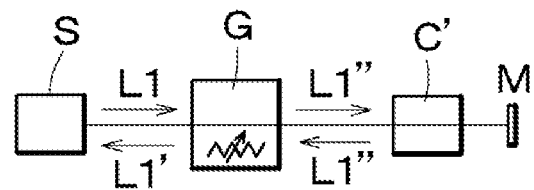

[Fig.8]
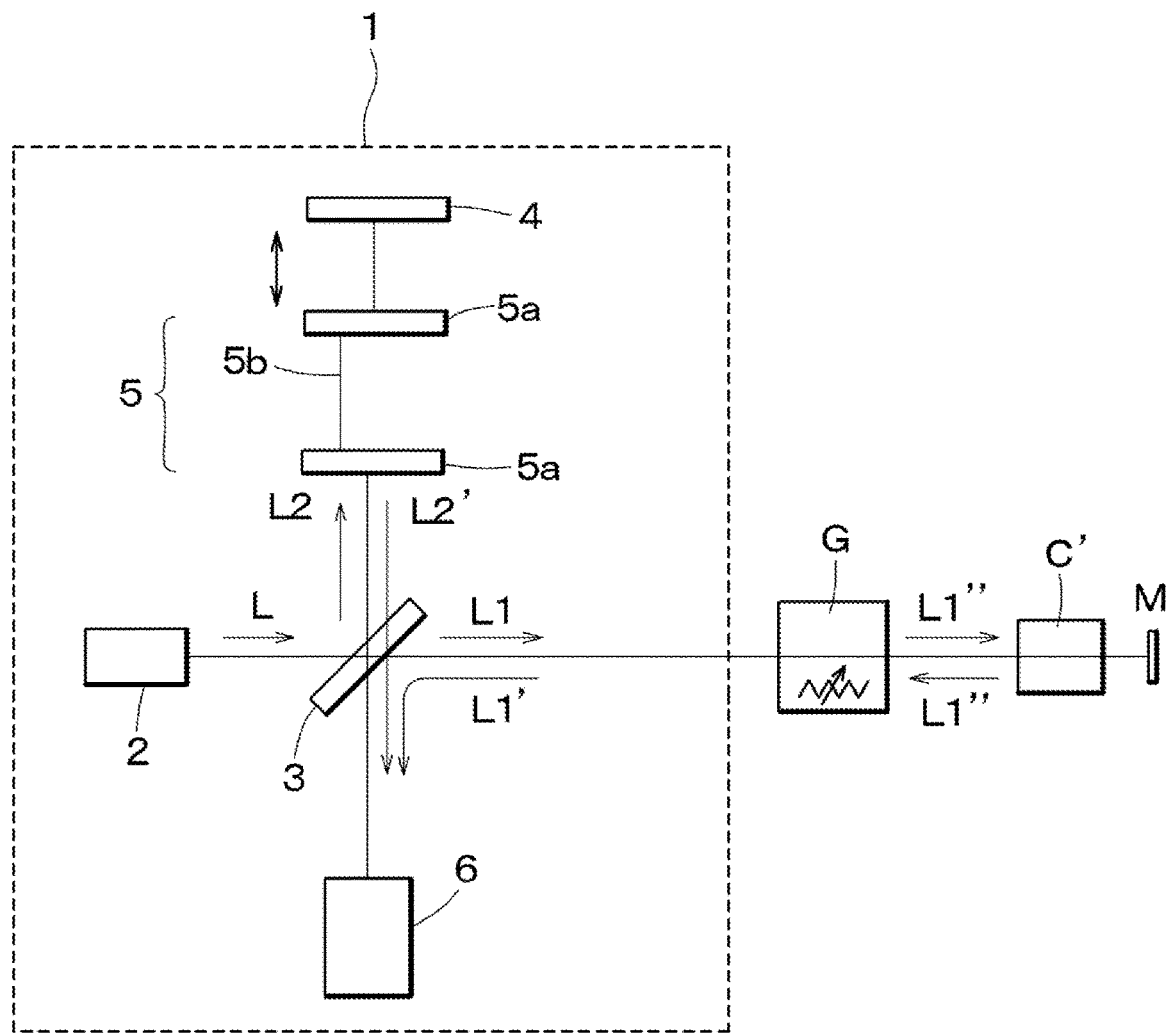

[Fig.9]
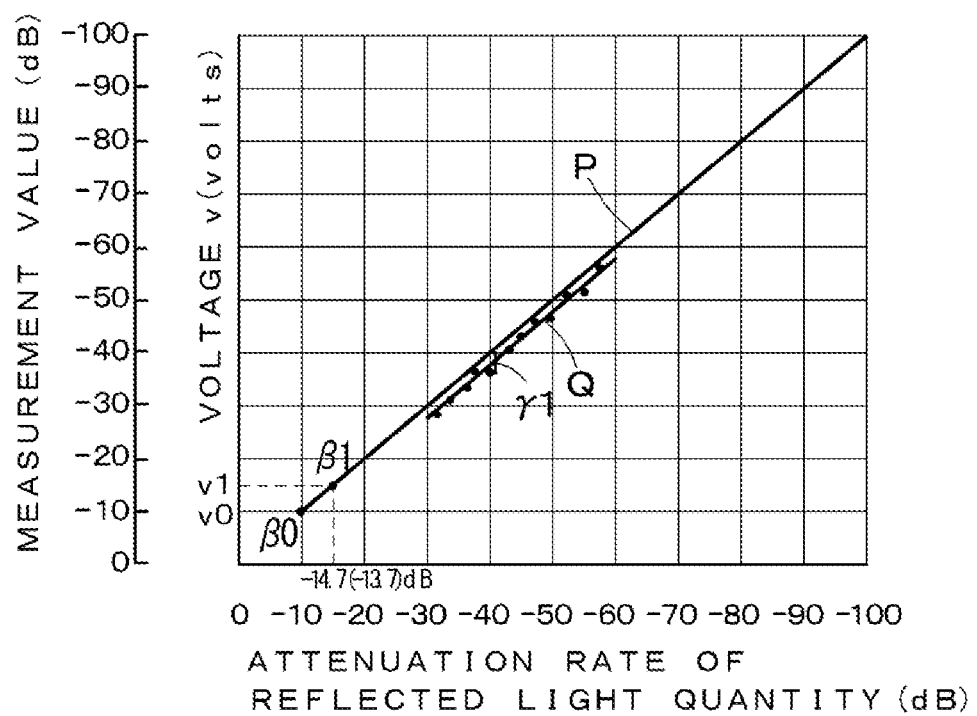

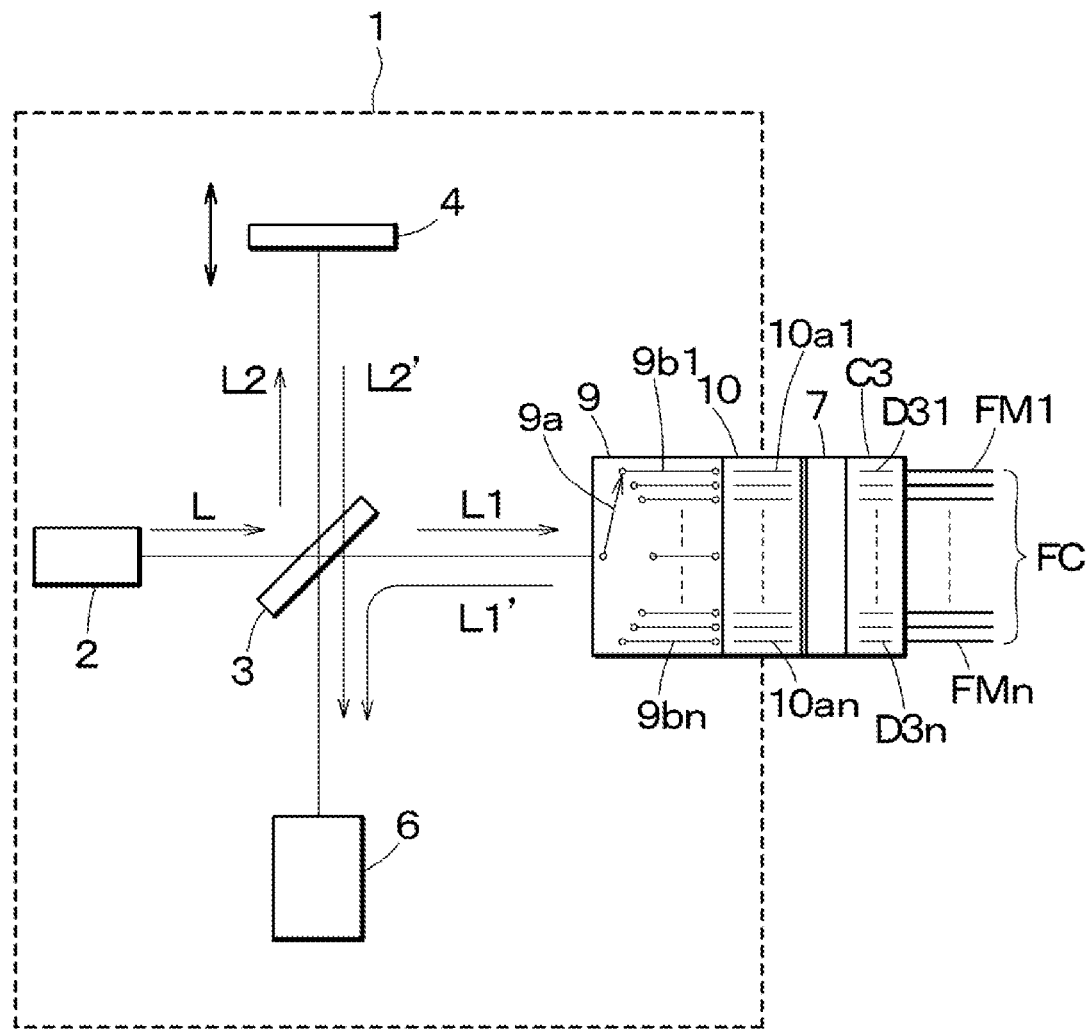
[Fig.10]

[Fig.11]
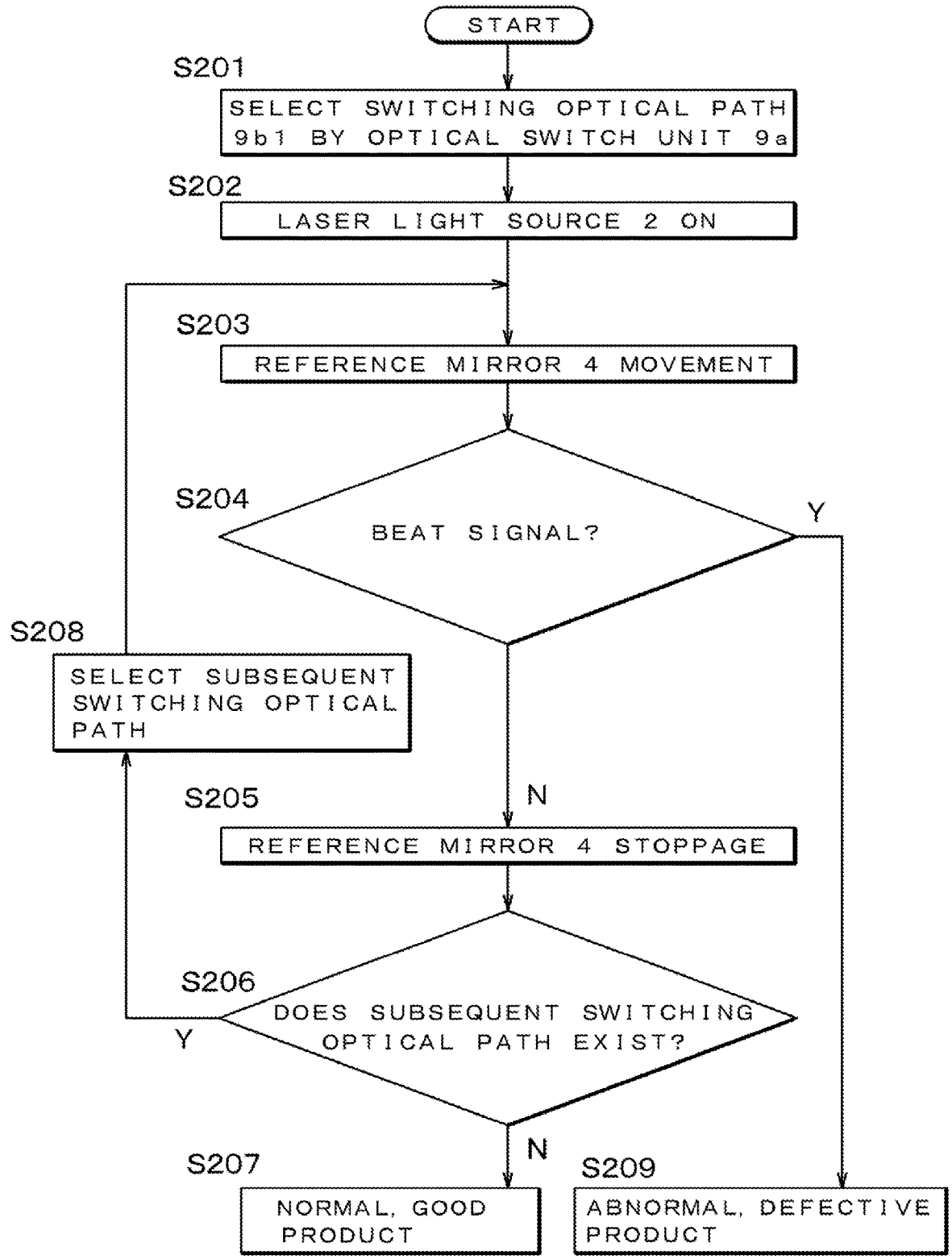

[Fig.12]
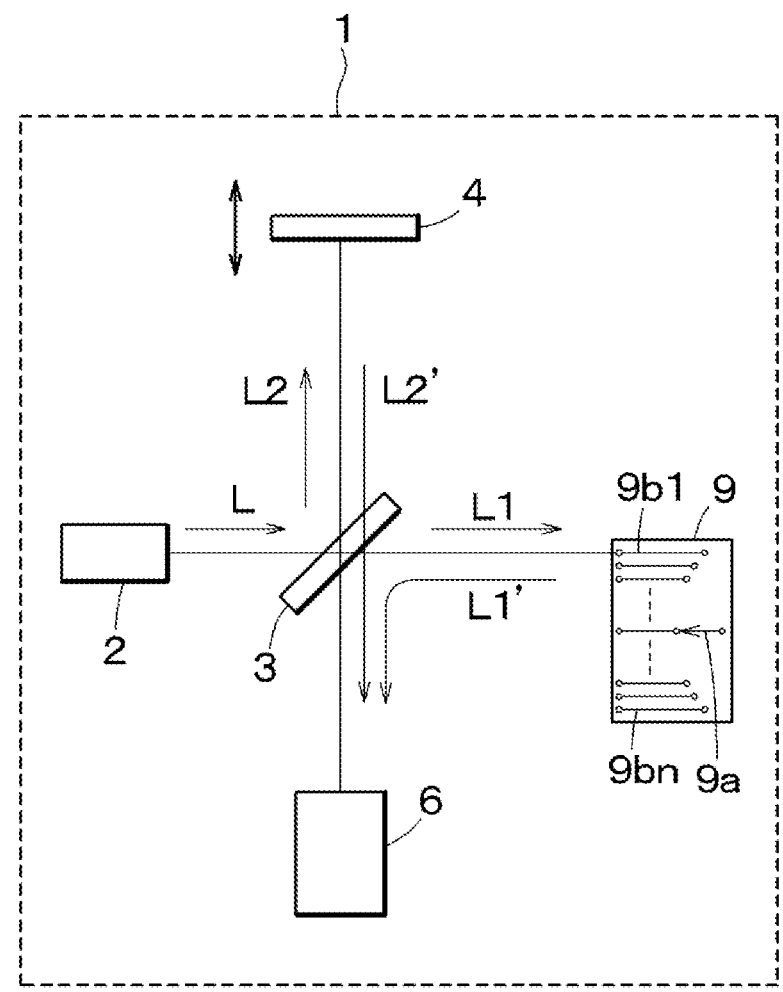

[Fig.13]
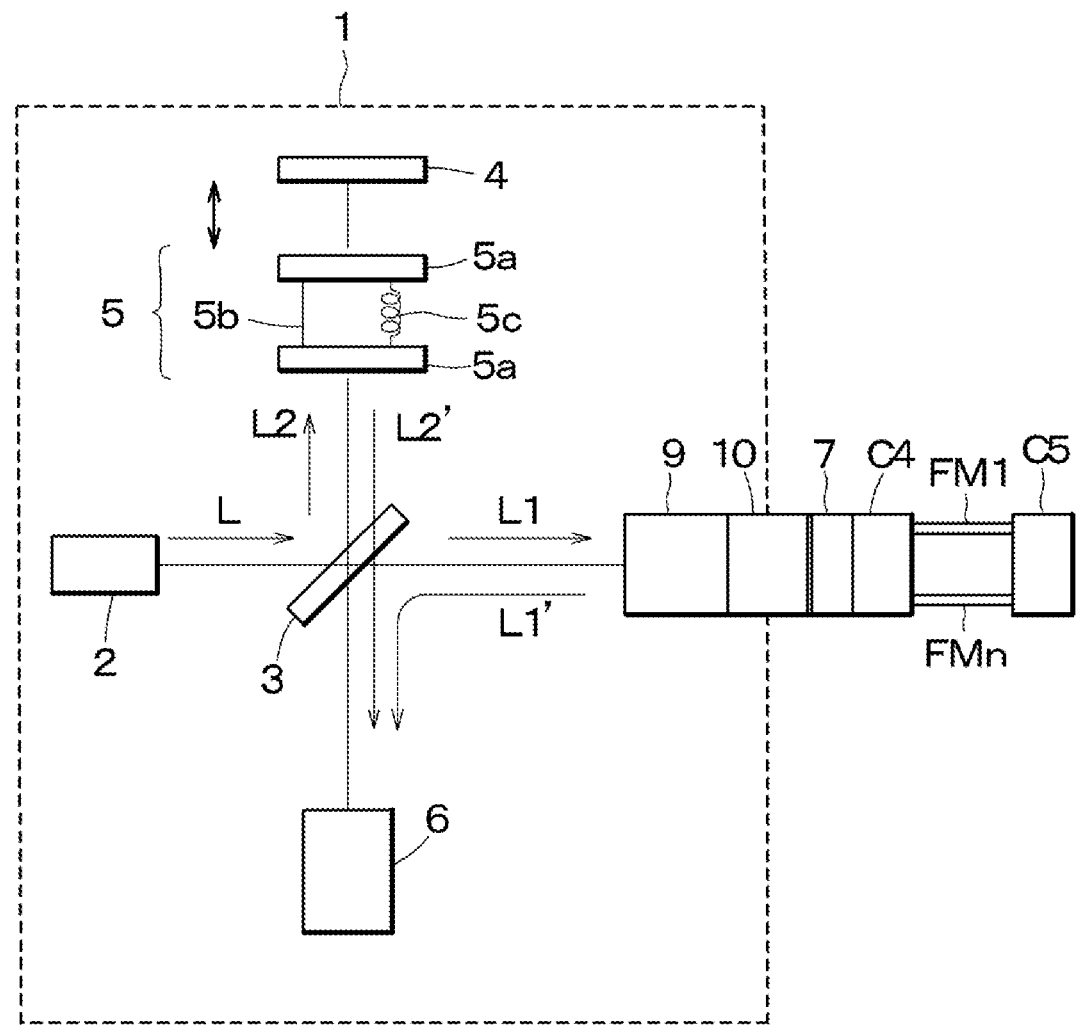

REFLECTED LIGHT MEASUREMENT DEVICE

FIELD OF THE DISCLOSURE

The present invention relates to a reflected light measurement device capable of specifying a defect site such as cracking and disconnection in a material to be measured which is formed from a light-transmitting material such as an optical fiber, measuring reflected light that occurs at the defect site, and digitizing a defect state.

BACKGROUND OF THE DISCLOSURE

Glass is used as a main material of the optical fiber, and thus there is a problem that disconnection or cracking is likely to occur. Particularly, when being processed into an optical connector, stress increases in the optical fiber, and thus disconnection frequently occurs in the optical connector.

In addition, in a state immediately after disconnection has occurred in the optical connector, optical fibers at a disconnection site are in close contact with each other, and thus a light quantity hardly varies, and is transmitted through the inside of the optical fibers. In addition, in a case where a disconnection surface of the optical fibers has a mirror surface shape without a strip-shaped unevenness, and the disconnection surface has an inclined surface shape, reflected light becomes extremely weak. In the case of disconnection in which reflected light due to the disconnection site hardly exists, that is, so-called hidden disconnection, a problem hardly occurs at the beginning of use.

However, with regard to the hidden connection, after passage of a long time, optical fibers at a portion of the hidden disconnection are gradually separated from each other due to repetition of expansion and contraction in accordance with a temperature variation of an adhesive used in the optical connector, vibration applied to the optical connector, or the like, and transmission performance of the optical fibers deteriorates. Therefore, there is a concern that communication failure may occur.

Here, disconnection inspection using optical reflectance that occurs at the disconnection site is performed immediately after assembling the optical fibers to the optical connector. Patent Document 1 discloses an optical fiber measurement device that measures a position and a size of a defect in a total length of the optical fibers by using an optical interference method.

CITATION LIST

Patent Document

Patent Document 1: JP-A-7-83790

SUMMARY OF THE DISCLOSURE

Technical Problem

A manufacturer of an optical fiber cable that is sold in a state in which optical fibers are assembled to an optical connector ships only good products after inspecting a disconnection state for every product by using, for example, a measurement device in Patent Document 1, or the like. In addition, in a case where hidden disconnection is found after shipment, it is preferable that the manufacturer can prove to which level that reflected light accompanying the disconnection was inspected at the time of shipment.

However, in the measurement device described in Patent Document 1, a rough disconnection state can be measured on the basis of intensity of reflected light from optical fibers. However, in a case where only weak reflected light is obtained as in the hidden disconnection, it is difficult to perform measurement with accuracy to a certain extent in which reflected light at a disconnection site is presented as a numerical value. Accordingly, there is a problem that it is difficult to explain that inspection was performed to which reflected light level at the time of shipment of the measurement device to a user.

In addition, inspection of disconnection inside the optical connector of the optical fiber cable is performed by connecting the optical connector to the measurement device, but the optical fiber cable includes the optical connector on both ends. According to this, when performing the disconnection inspection, after inspecting one of the optical connectors, it is necessary that the one optical connector is detached, and then the other optical connector is connected to the measurement device to inspect the other optical connector. Accordingly, measurement work is complicated and takes time.

In addition, typically, the optical fiber cable includes an optical fiber bundle including approximately several to 4,000 core wires, and the optical connector that is connected to the optical fiber cable has a configuration capable of simultaneously connecting the number of the core wires of the optical fiber, for example, as in a multi-fiber push-on (MPO) connector. In the case of performing disconnection inspection on the optical connector to which a plurality of optical fibers are connected, it is necessary to repetitively perform work of connecting the measurement device and the optical connector to each other in the number of times corresponding to the number of the optical fibers.

There is a method in which an optical path switching unit, for example, an optical switch is provided in an optical connector connection portion of the measurement device, connection with the optical connectors is sequentially switched, and inspection is performed in the number of times corresponding to the number of the optical fibers. However, in the optical switch that is a commercially available product, optical path lengths of respective channels are individually different from each other, and thus it is necessary to adjust an optical path length of reference light inside the measurement device to generate interference light whenever switching the optical path. In addition, for example, in a case where a difference in the optical path length for every channel of the optical switch is several centimeters, it is necessary to provide an optical path length adjustment mechanism in the measurement device.

As described above, in the disconnection inspection on the optical connector to which the optical fiber cable including the plurality of optical fibers is connected, significant labor and time are required for the complicated connection work between the measurement device and the optical connector.

Here, the manufacturer of the optical fibers desires to have an inspection device capable of digitizing to which level reflected light was inspected with respect to emitted light from the measurement device in a disconnection state, and capable of guaranteeing a quality that a test was performed to a predetermined measurable reflectance. Particularly, there is a demand for an inspection device capable of measuring a reflectance in a short time and simple work with respect to the optical connector attached to both ends of the optical fibers, or a plurality of optical connectors attached to a plurality of optical fibers.

An object of the invention is to provide a reflected light measurement device capable of obtaining an occurrence position of a defect site such as minute cracking and disconnection inside an optical connector, performing digitization of reflected light with high reliability, and effectively performing disconnection inspection on an optical connector on both ends and a plurality of optical fibers.

Another object of the invention is to provide a reflected light measurement device capable of effectively performing disconnection inspection on an optical connector to which an optical fiber cable including a plurality of optical fiber is connected.

Solution to Problem

According to an aspect of the invention, there is provided reflected light measurement device including: a laser light source that emits laser light; a beam splitter that branches the laser light into measurement laser light to be transmitted and reference laser light to be reflected; a connection unit that is disposed on an optical path of the measurement laser light that is transmitted through the beam splitter; a reference mirror including an optical path length varying mechanism capable of adjusting an optical path length of the reference laser light; and a photometer that receives the measurement laser light reflected at a defect site of a material to be measured which is formed from a light-transmitting material, and the reference laser light reflected by the reference mirror through the beam splitter. The defect site is detected on the basis of interference light by the reference laser light and the measurement laser light which are received by the photometer. A switching unit that switches an optical path of the reference laser light is disposed between the beam splitter and the reference mirror, or an optical path switching unit that switches an optical path of the measurement laser light and an optical path length adjustment unit that is connected to the optical path switching unit and adjusts an optical path length of the optical path switching unit are disposed between the beam splitter and the connection unit.

Advantageous Effects of the Invention

According to the reflected light measurement device, it is possible to detect a position of a defect site such as disconnection and cracking, from which reflected light is very weak, inside an optical connector, and it is possible to digitize to which level reflected light is inspected with respect to emitted light and to output the resultant value.

In addition, it is possible to continuously inspect the optical connector attached to both ends of the optical fiber without changing a connection state of the optical fiber with respect to the reflected light measurement device. Similarly, it is possible to inspect a light-transmitting material such as an optical connector in which a plurality of optical fibers are disposed as in an MPO connector, and a contact lens by using optical paths of measurement laser light which are arranged in parallel.

In addition, when using the optical path switching unit and the optical path length adjustment unit, optical path lengths of respective channels become equal to each other, and it is possible to effectively perform disconnection inspection by sequentially switching optical fibers connected to the reflected light measurement device by the optical path switching unit.

BRIEF DESCRIPTION OF THE DRAWINGS

FIG. 1 is a configuration diagram of a reflected light measurement device of Example 1.

FIG. 2 is a flowchart illustrating a disconnection defect detection method.

FIG. 3 is a graph of a relationship between a distance of a defect site and a reflection level of interference light.

FIG. 4 is a configuration diagram of a reflected light measurement device of Example 2.

FIG. 5 is a configuration diagram for obtaining characteristic data of an optical attenuator that becomes a reference by using a photometer.

FIG. 6 is a graph of characteristic data of the optical attenuator.

FIG. 7 is a configuration diagram in the case of performing a reference setting process.

FIG. 8 is a configuration diagram for obtaining a calibration line.

FIG. 9 is a graph of the calibration line that is used in the reflected light measurement device.

FIG. 10 is a configuration diagram of a reflected light measurement device of Example 3.

FIG. 11 is a flowchart of a disconnection defect detection method.

FIG. 12 is a configuration diagram at the time of detecting an optical path length variation of an optical path switching unit.

FIG. 13 is a configuration diagram of a reflected light measurement device of Example 4.

DETAILED DESCRIPTION OF THE EXEMPLARY EMBODIMENTS

The invention will be described in detail on the basis of the following examples.

Example 1

FIG. 1 is a configuration diagram of a reflected light measurement device 1 of Example 1. A connector C1 to be measured on one end of an optical fiber cable FC is connected to the reflected light measurement device 1 through a connection unit, and a connector C2 to be measured is connected to the other end of the optical fiber cable FC. Inspection for a defect site such as disconnection with respect to the connectors C1 and C2 to be measured by the reflected light measurement device 1 is based on the principle of a Michelson interferometer.

As illustrated in FIG. 1, the reflected light measurement device 1 includes a laser light source 2, a beam splitter 3, a reference mirror 4, an optical path length switching unit 5, a photometer 6, and a connection unit 7.

The laser light source 2 emits laser light L that is low interference light, and the beam splitter 3 equally branches a light quantity of laser light L into measurement laser light L1 to be transmitted and reference laser light L2 to be reflected. In addition, in the laser light source 2, temperature control by a Peltier element or the like is performed to maintain stability of laser light with respect to temperature characteristics.

The reference mirror 4 includes an optical path length varying mechanism capable of adjusting an optical path length of the reference laser light L2. The optical path length switching unit 5 is disposed between the reference mirror 4 and the beam splitter 3, and switches the optical path length of the reference laser light L2 into a plurality of fixed lengths.

The photometer 6 receives measurement laser light L1' reflected at defect sites D1 and D2 such as disconnection inside the connectors C1 and C2 to be measured, and reference laser light L2' that is reflected by the reference mirror 4 through the beam splitter 3. The connection unit 7 is disposed on an optical path of the measurement laser light L1 that is transmitted through the beam splitter 3.

Note that, a calculation control unit (not illustrated) is connected to the reflected light measurement device 1, and the calculation control unit controls an operation of the respective members, calculates a measurement value obtained by the photometer 6, or the like, and digitizes and outputs a position of a defect site and a degree thereof. Particularly, the calculation control unit has a function of storing a calibration line to be described later, and calculating a reflectance from a measurement value from the photometer 6 on the basis of the calibration line.

The measurement laser light L emitted from the laser light source 2 is branched in the beam splitter 3, and the measurement laser light L1 that is transmitted through the beam splitter 3 and propagates straightly is transmitted to the connector C1 to be measured and the connector C2 to be measured. An optical path ranging from the beam splitter 3 to the connector C1 to be measured and the connector C2 to be measured is set as an optical fiber, and is connected to the connectors C1 and C2 to be measured through the connection unit 7 provided at an end of the optical fiber.

In addition, a part of the measurement laser light L is reflected by the beam splitter 3 and becomes the reference laser light L2, and is transmitted to the optical path length switching unit 5. The optical path length switching unit 5 includes an optical switch 5a on both ends thereof, and a plurality of fixed-length optical fibers set to a predetermined optical path length are disposed on a connection terminal (not illustrated) of the optical switch 5a.

The fixed-length optical fibers include a first fixed-length optical fiber 5b having an optical path length for the connector C1 to be measured as an optical connector on one end of the optical fiber cable FC, and a second fixed-length optical fiber 5c having an optical path length for the connector C2 to be measured as an optical connector on the other end, and are connected to the optical switch 5a in parallel.

Two or more second fixed-length optical fibers 5c may be disposed in correspondence with a length of the optical fiber cable FC, or the above-described connection terminal may be disposed on an outer surface of the reflected light measurement device 1 and the first fixed-length optical fiber 5b and the second fixed-length optical fiber 5c may be appropriately exchanged in correspondence with the length of the optical fiber cable FC.

In addition, in the configuration diagram in FIG. 1, a pair of the optical switches 5a is disposed, but only one optical switch 5a close to the beam splitter 3 may be disposed. In this case, an optical path including the first fixed-length optical fiber 5b and an optical path including the second fixed-length optical fiber 5c up to the reference mirror 4 may be disposed in parallel, and an optical path length can be changed with respect to each of the optical paths by an optical path length varying mechanism to be described later.

The reference laser light L2 is transmitted through the first fixed-length optical fiber 5b or the second fixed-length optical fiber 5c through a switching operation of the optical switch 5a, and is set to a predetermined optical path length.

At this time, an optical path length of the first fixed-length optical fiber 5b is set to be approximately the same as an optical path length of the measurement laser light L1 up to the connection unit 7.

On the other hand, an optical path length of the second fixed-length optical fiber 5c is set to be approximately the same as a length obtained by adding the optical path length of the optical fiber cable FC that is an inspection target to the optical path length of the first fixed-length optical fiber 5b. In this manner, the reference laser light L2 that is branched by the beam splitter 3 is transmitted to the reference mirror 4 through the optical path length switching unit 5. The reference mirror 4 includes the optical path length varying mechanism capable of moving to an arbitrary position along an optical axis of the reference laser light L2, and minute adjustment is applied to the optical path length of the reference laser light L2.

Note that, as the optical path length varying mechanism of the reference mirror 4, a rotary reflector can also be used. The rotary reflector employs a mechanism having a radius of 20 mm and a rotation speed of 1.1 revolutions/second to secure a variable range of 20 mm as a measurement length.

In addition, in a case where a defect site such as disconnection exists inside the connector C1 or C2 to be measured, the measurement laser light L1' reflected at the defect site D1 or D2 is reflected by the beam splitter 3 and is transmitted to the photometer 6.

On the other hand, the reference laser light L2 is transmitted by selectively switching the first fixed-length optical fiber 5b or the second fixed-length optical fiber 5c by the optical switch 5a, is reflected by the reference mirror 4 and becomes the reference laser light L2', is transmitted by selectively switching the first fixed-length optical fiber 5b or the second fixed-length optical fiber 5c by the optical switch 5a, is transmitted through the beam splitter 3, and is transmitted to the photometer 6.

Note that, an optical fiber can be used in each optical path, and the measurement laser light L may be caused to propagate straightly and be branched by using a fiber coupler instead of the beam splitter 3. In addition, a lens optical system may be used in an optical path of an actual interference system, and a polarization beam splitter, and a ¼ wavelength plate may be used, but this method is a known method, and thus the description thereof will be omitted.

For example, low-interference laser light having a wavelength of 1310 mm is emitted from the laser light source 2, a defect measurement range in the vicinity of the optical fibers inside the connectors C1 and C2 to be measured is set to, for example, 0 to 20 mm, and a measurement resolution length is set to, for example, 1.25 μm. Accordingly, a variable range of the optical path length varying mechanism of the reference laser light L2 is also set to be equivalent to 20 mm. Note that, the optical path length variable range is set to be approximately the same as the optical path length of the connectors C1 and C2 to be measured and is to be changed in correspondence with a size of the connectors, and is not limited to 20 mm.

Next, a method of detecting a position of the optical connector defect site by the reflected light measurement device 1 will be described with reference to the flowchart in FIG. 2. First, in step S101, the connector C1 to be measured as an optical connector on one end of the optical fiber cable FC for which defect inspection is to be performed is connected to the connection unit 7 having a connector shape. It is assumed that the first fixed-length optical fiber 5b is selected as an optical path of the reference laser light L2 under switching control by the optical switch 5a. Since the first fixed-length optical fiber 5*b* is selected, the optical path length of the reference laser light L2 becomes approximately the same as the optical path length of the measurement laser light L1 up to the connection unit 7.

Next, in step S102, the measurement laser light L is emitted from the laser light source 2, and is branched into the measurement laser light L1 toward the connector C1 to be measured, and the reference laser light L2 toward the reference mirror 4 side by the beam splitter 3.

In step S103, a reference optical path length by the reference laser light L2 is moved in a variable range along the optical axis of the reference mirror 4. An adjustment range of the optical path length approximately corresponds to an optical distance from the connection unit 7 to the connector C1 to be measured. Due to movement of the reference mirror 4 of this reference optical system, when a measurement optical path length up to the defect site D1 inside the connector C1 to be measured by the measurement laser light L1, and a reference optical path length up to the reference mirror 4 by the reference laser light L2 match each other, a peak-shaped beat signal e by interference light received by the photometer 6 is obtained as illustrated in FIG. 3.

In step S104, it is determined whether or not the above-described peak-shaped beat signal e is received by the photometer 6. When the defect site D1 does not exist inside the connector C1 to be measured, the measurement laser light L1 is not reflected and is not returned to the photometer 6, and is transmitted through the optical fiber cable FC. When the beat signal e is not detected, it is determined that the connector C1 to be measured is normal, and the process transitions to step S105, and movement of the reference mirror 4 is stopped.

In step S106, an optical path that is selected by the optical switch 5*a* is switched from the first fixed-length optical fiber 5*b* to the second fixed-length optical fiber 5*c*. Since the second fixed-length optical fiber 5*c* is selected, the optical path length of the reference laser light L2 becomes approximately the same as the optical path length of the measurement laser light L1 up to the connector C2 to be measured.

In step S107, the reference optical path length by the reference laser light L2 is minutely adjusted by moving the reference mirror 4 along the optical axis. An adjustment range of the optical path length approximately corresponds to the optical path length of the connector C2 to be measured. Due to movement of a position of the reference mirror 4 of this reference optical system, when a measurement optical path length up to the defect site D2 inside the connector C2 to be measured by the measurement laser light L1, and the reference optical path length up to the reference mirror 4 by the reference laser light L2 match each other, the peak-shaped beat signal e by interference light received by the photometer 6 is obtained.

In step S108, it is determined whether or not the above-described peak-shaped beat signal e is received by the photometer 6. When the defect site D2 does not exist inside the connector C2 to be measured, the measurement laser light L1 is not reflected and is not returned to the photometer 6, and propagates to the outside from the connector C2 to be measured. When the beat signal e is not detected, it is determined that the connector C2 to be measured is not abnormal, and the process transitions to step S109, and movement of the reference mirror 4 is stopped. In addition, since the connector C1 to be measured and the connector C2 to be measured which are attached to the optical fiber cable FC that is an inspection target are normal, determination is made as a good product, and the inspection is terminated.

On the other hand, in a case where the peak-shaped beat signal e is detected in step S104, it is determined that a disconnection defect due to the defect site D1 exists inside the connector C1 to be measured. FIG. 3 is a graph illustrating a distance of the defect site D1 inside the connector C1 to be measured, and a reflection level of interference light of the measurement laser light L1' as a measurement optical system and the reference laser light L2' as a reference optical system. For example, a state in which a defect such as disconnection occurs at a position of 10 mm inside the connector C1 to be measured and the above-described beat signal e is shown in an optical path length of the reference optical system is illustrated.

Since the magnitude of the peak-shaped beat signal e, that is, the magnitude of the reflection level is remarkably larger than a reflection level at a position without a defect, when the beat signal e is obtained, it can be easily determined that a defect such as disconnection occurs inside the connector C1 to be measured, and the defect site can be specified as described above.

Note that, the measurement is performed by a high-sensitivity interference method. Accordingly, even in hidden disconnection, with which only weak reflected light is obtained, inside the connector C1 to be measured, a reflection level of the beat signal e becomes remarkably larger, and thus as the reflection level, αdB can be obtained. The process transitions to step S110, movement of the reference mirror 4 is stopped, it is determined that the connector C1 to be measured which is attached to the optical fiber cable FC is a defective product, and the inspection is terminated.

In addition, in a case where the peak-shaped beat signal e is detected in step S108, it is determined that a disconnection defect due to the defect site D2 exists inside the connector C2 to be measured. The beat signal e that is detected is the same as in the case of the defect site D1 inside the connector C1 to be measured, and thus the description thereof will be omitted. The process transitions to step S110, movement of the reference mirror 4 is stopped, the connector C2 to be measured which is connected to the optical fiber cable FC as an inspection target is determined as a defective product, and inspection is terminated.

As described above, in the reflected light measurement device 1 of Example 1, when connection of the optical fiber cable FC as an inspection target is established once, it is possible to inspect the connector C1 to be measured and the connector C2 to be measured which are attached to both ends of the optical fiber cable FC through a series of operations without particularly changing a connection state.

Example 2

FIG. 4 is a configuration of a reflected light measurement device 1 of Example 2, and a plurality of optical fibers as an inspection target are provided. A connector-shaped connection unit 7 that can be connected to a connector C1 to be measured which is an MPO connector, and an optical path portion switching unit 8 is disposed between the connector-shaped connection unit 7 and the beam splitter 3. The optical path portion switching unit 8 includes an optical switch, the same number of optical path portions as the number of fibers bundled in the MPO connector are disposed between the optical path portion switching unit 8 and the connection unit 7, and the optical path portions can be switched under switching control by the optical switch of the optical path portion switching unit 8.

In the optical fiber cable FC as an inspection target connected to the connection unit 7, N pieces of optical fibers FM1 to FMn are bundled. For example, 24 pieces of optical fibers as a typical number are bundled. A connector C1 to be measured as an MPO connector in which optical fibers FM1 to FMn corresponding to the n pieces are bundled is attached to an end of the optical fiber cable FC, and typical connectors C21 to C2n to be measured are attached to the other end.

In addition, an optical path length of the first fixed-length optical fiber 5b of the same optical path length switching unit 5 as in Example 1 is set to be approximately the same as an optical path length of the measurement laser light L1 to the connection unit 7. On the other hand, in a case where an optical path length of the optical fibers FM1 to FMn is constant, the optical path length of the second fixed-length optical fiber 5c is set to be approximately the same as a value obtained by adding the optical path length of the first fixed-length optical fiber 5b to the optical path length.

In a case where two or more values exist as the optical path length of the optical fibers FM1 to FMn, two or more kinds of the second fixed-length optical fibers 5c are also prepared in advance in correspondence with the case, and connection thereof is set to be switchable by the optical switch 5a. Alternatively, the second fixed-length optical fiber 5c may be replaced during measurement in correspondence with the optical path length of the optical fibers FM1 to FMn. The other configurations of the reflected light measurement device 1 are the same as in Example 1, and thus the description thereof will be omitted.

In Example 2 configured as described above, the same procedure as in the flowchart illustrated in FIG. 2 as a method of detecting a position of the optical connector defect site according to Example 1 can be employed as a method of detecting a position of a defect site.

That is, it is possible to detect defect sites D1i to D1n corresponding to the optical fibers FM1 to FMn inside the connector C1 to be measured as an MPO connector, and defect sites D21 to D2n corresponding to the connectors C21 to C2n to be measured through a series of operations by repeating the same procedure as in the flowchart in FIG. 2 n times while sequentially switching the optical fibers FM1 to FM1 which are connected by the optical path portion switching unit 8.

Accordingly, it is not necessary to individually attach the n pieces of branched connectors C21 to C2n to be measured on the other end of the optical fibers FM1 to FMn to the reflected light measurement device 1, and thus inspection work is significantly reduced.

In addition, in the reflected light measurement device 1 of Example 2, the optical path length switching unit 5 that switches the optical path length of the reference laser light L2 to a plurality of fixed lengths is disposed, but the optical path length switching unit 5 may not be provided. In this case, a measurement target is set to only one end, and it is possible to diagnose the defect sites D11 to D1n corresponding to the optical fibers FM1 to FMn inside the connector C1 to be measured which is connected to the connection unit 7.

In addition, the measurement target of the reflected light measurement device 1 of Example 2 is described with reference to the optical fibers inside the connection to be measured, but it is also possible to diagnose a defect site of a material to be measured which is formed from a light-transmitting material such as a glass plate and a contact lens in addition to the optical fibers inside the connector to be measured. In this case, it is also possible to diagnose a defect site of the light-transmitting material by attaching a collimator to a tip end of the connectors C21 to C2n to be measured, and by adjusting an optical path length varying mechanism of the reference mirror 4 so that the optical path length of the reference laser light L2' of each of the connectors C21 C2n to be measured includes a material to be measured which is disposed at a collimation destination.

As described in Examples 1 and 2, in a case where the defect site of the material to be measured which is formed form a light-transmitting material is not found through defect position detection by the interference method, it can be determined that a defect does not exist in the connector C to be measured, but in a case where a defect site is detected, it is necessary to inspect the degree of the defect. In this case, it is possible to estimate a defect state such as disconnection inside the connector C to be measured to a certain extent by measuring the magnitude of the measurement laser light L1' that is obtained by the photometer 6 and is reflected light from the defect site of the connector C to be measured, that is, the reflection level adB.

However, it is difficult to accurately digitize the degree of a defect such as disconnection of the connector C to be measured from the magnitude of the reflection level adB. The reason for this is as follows. Even when the degree of the defect is the same in each case, the magnitude of the beat signal e that is obtained by the photometer 6 is greatly influenced by individual characteristics of the photometer 6, an amplification circuit that is used, or the like, and thus the magnitude is different for every reflected light measurement device 1.

Here, in the reflected light measurement device 1, light-receiving characteristics of the photometer 6 in the reflected light measurement device 1 are calibrated by using an optical apparatus or an optical system that becomes a reference to generally digitize a reflectance with respect to the defect such as disconnection inside the connector C to be measured. In addition, a calibration line thereof is stored in a calculation control unit for every reflected light measurement device 1, and in actual inspection by the reflected light measurement device 1, it is necessary to perform calibration on the basis of an output of the photometer 6.

With regard to the calibration process, several methods are considered, and the following description relates to one method. In a calibration process of the reflected light measurement device 1, first, linearity between a setting value of an optical attenuator and the amount of attenuation measured is evaluated by using a separate optical attenuator that becomes a reference.

The evaluation process is performed by disposing an optical attenuator G between the laser light source 2 that is the same as a product used in the reflected light measurement device 1 and a reference photometer PD that is a commercially available power meter. With regard to the reference photometer PD, it is possible to accurately measure a light quantity that is great to a certain extent, but it is difficult to measure a light quantity as weak as −50 dB or less due to performance of the reference photometer PD.

First, an attenuation rate of an optical attenuator G is set to 0 dB, the measurement laser light L1 is caused to be incident to the reference photometer PD to measure a light quantity r0, and the light quantity r0 is set to 0 dB as a zero reference point. In addition, the light quantity r is measured while varying the attenuation rate by changing the setting value of the optical attenuator G.

In this manner, with respect to the optical attenuator G to be a reference, characteristic data relating to a relationship between the setting value of the optical attenuator G and the amount of attenuation is obtained by using the reference photometer PD that becomes a reference, and the laser light source 2 that is the same product as in the reflected light measurement device 1.

FIG. 6 is a graph illustrating a relationship between the setting value of the optical attenuator G in an X-axis and a measurement value obtained by the reference photometer PD in a Y-axis, and the following process of setting a reference of a reflected light quantity is performed by using the optical attenuator G having characteristic data with linearity.

As illustrated in FIG. 7, the optical attenuator G is disposed between a reflection measurement device S for calibration and a connector C' to be measured for calibration, and the process of setting a reference of the reflected light quantity. As the connector C' to be measured for calibration, a connector without a defect site is used, and a reflection mirror M that performs total reflection is disposed at the rear of the connector C' to be measured for calibration.

The reflection measurement device S for calibration includes a laser light source and a reference photometer (not illustrated), and can measure a measurement value indicating a reflectance from the light quantity of received measurement laser light L1' with respect to the light quantity of the measurement laser light L1.

The measurement laser light L1 is allowed to pass through the optical attenuator G and the connector C' to be measured for calibration, and measurement laser light L1' as reference reflected light is created subsequently to measurement laser light L1" that is totally reflected by the reflection mirror M.

Note that, the setting value of the optical attenuator G relates to one direction in FIG. 5, but the setting value relates to reciprocation directions in FIG. 7, and thus an attenuation rate becomes two times in a dB notation. However, it is assumed that the attenuation is defined by a ratio between first measurement laser light L1 and final measurement laser light L1' of the optical attenuator G for easy understanding, and is expressed as the setting value.

In the process of setting the reference of the reflected light quantity, the setting value of the optical attenuator G is adjusted so that a light quantity received by the reflection measurement device S for calibration becomes −14.7 dB as a reflectance between a cut-out surface of a typical optical fiber and air. In addition, the setting value of the optical attenuator G at this time is stored as a setting value g with which the reference reflected light quantity value of −14.7 dB is obtained.

That is, when the setting value g of the optical attenuator G is set to a value higher than −14.7 dB, for example, g=−13.7 dB due to loss of the connector C' to be measured for calibration or a measurement system such as the reflection mirror, the reflected light quantity received by the reflection measurement device S for calibration is measured as −14.7 dB, and thus the setting value g of −13.7 dB is retained. Note that, a difference between the setting value g of the optical attenuator G and an actual attenuation rate of the reflected light quantity is caused by loss of the measurement optical system, and thus it can be understood that the difference becomes a constant value even when the light quantity of the measurement laser light L1 varies.

As described above, calibration of the light-receiving characteristics of the photometer 6 of the reflected light measurement device 1 is performed by using the optical attenuator G for which the reference setting of the reflected light quantity is performed so that the measurement laser light L1' with respect to the measurement laser light L1 becomes −14.7 dB, the connector C' to be measured for calibration, and the reflection mirror M.

The optical attenuator G, the connector C' to be measured for calibration, and the reflection mirror M are connected to the reflected light measurement device 1 in which the optical path length switching unit 5 is set to the first fixed-length optical fiber 5b as illustrated in FIG. 8, and calibration data is obtained for every individual reflected light measurement device 1. When performing calibration, a measurement optical path length up to the reflection mirror M by the measurement laser light L1, and a reference optical path length up to the reference mirror 4 by the reference laser light L2 are set to match each other.

In this state, a virtual line P that is a calibration line is created by using a voltage value obtained when interference light including a reflected light quantity of the measurement laser light L1' of −14.7 dB set as a reference is received by the photometer 6. In FIG. 9, the horizontal axis represents an attenuation rate of a reflected light quantity as a reference, and the vertical axis represents a voltage V of a light quantity received by the photometer 6.

In the configuration diagram illustrated in FIG. 8, a voltage that is obtained when inference light including the reflected light quantity of −14.7 dB set as a reference is received by the photometer 6 is set to a voltage V1, plotting is performed on a graph illustrated in FIG. 9 with the voltage V1 set as a reference point β1. Note that, a setting value of the optical attenuator G which corresponds to an attenuation rate is shown in parentheses of −14.7 dB on the horizontal axis of the reference point β1 in the drawing.

In addition, a voltage V0 of the photometer 6 at which the attenuation rate of the reflected light quantity corresponds to −10 dB is calculated from the voltage V1, and the voltage V0 is set to −10 dB on the vertical axis. An intersection between the attenuation rate of −10 dB and the voltage V0 is set as a starting point β0, and the virtual line P is drawn to pass through the starting point β0 and the reference point β1. As described above, when the virtual line P that is obtained is stored in the calculation control unit, it is possible to output an attenuation rate of the reflected light quantity on the virtual line P, that is, a reflection level with respect to an output voltage obtained by the photometer 6 of the reflected light measurement device 1.

In addition, the virtual line P is linearized by calculating the starting point β0 from only one point of the reference point β1 as described above. However, the attenuation rate of the reflected light quantity is adjusted to −10 dB by changing the setting value of the optical attenuator G illustrated in FIG. 5, a voltage V2 at this time is measured, and an intersection between the attenuation rate of −10 dB and the voltage V2 is set as a measurement starting point β2. In this manner, two or more measurement points may be obtained, and a virtual line P' may be drawn to pass through the measurement starting point β2 and the reference point β1. Since measured values are also used in the measurement starting point β2, accuracy of the virtual line P' can be set to be higher in comparison to the virtual line P.

The virtual line P' obtained as described above is stored in the calculation control unit, it is possible to output a reflectance of a reflected light quantity, that is, a reflection level with higher accuracy with respect to an output voltage corresponding to interference light obtained by the photometer 6 of the reflected light measurement device 1.

In addition, there is a possibility that a deviation may occur between an inclination "a" of the virtual line P' and an inclination of the virtual line P, and thus the virtual line P' may be multiplied by a reciprocal "1/a" of the inclination a to be calibrated to the virtual line P.

Hereinbefore, description has been given on the assumption that for example, one amplification circuit is disposed in the reflected light measurement device 1. However, actually, when the reflectance becomes minute, many amplification circuits, for example, four amplification circuits are connected to the reflected light measurement device 1 in series, and these amplification circuits are used while being switched.

For example, measurement is performed while automatically switching a gain range such as −10 to −40 dB in only one amplification circuit, −30 to −60 dB in two amplification circuits connected to each other, −50 to −80 dB in three amplification circuits connected to each other, and −70 to −100 dB in four amplification circuits connected to each other. In the case of using a plurality of amplification circuits as described above, it is necessary to obtain a calibration line based on individual electric characteristics for each of the plurality of amplification circuits with respect to the virtual line P that is set in only one amplification circuit.

With regard to a calibration method, first, in the case of being switched to connection of two amplification circuits, a setting value g of the optical attenuator G is set to be an attenuation rate of −30 dB, and a voltage v of the photometer 6 is recorded while appropriately changing the attenuation rate up to −60 dB. In this manner, a plurality of record points can be shown in a graph.

In addition, γ1 dB, γ2 dB, . . . are recorded as a difference from the virtual line P for every record point, and an average difference value γ dB is calculated. In addition, for example, in a case where the average difference value γ dB becomes +1 dB, a calibration line Q that deviates from the virtual line P by 1 dB can be obtained as correction data.

That is, in the measurement state illustrated in FIG. 1, in a case where two amplification circuits exist, an output along the calibration line Q illustrated in FIG. 9 is obtained, and the average difference value γ dB is calculated by repeating this case in combination with a case where three amplification circuits are connected and a case where four extension circuits, and respective calibration lines Q are obtained. In addition, the virtual line P, and one or a plurality of the calibration lines Q are stored in the calculation control unit. Note that, the average difference value γ dB with respect to the virtual line P may be stored instead of the calibration line Q.

As described above, the calculation control unit can output a reflectance of a reflected light quantity, that is, a reflection level from the virtual line P or the calibration line Q corresponding to the voltage v that is measured.

As described above, in the example, the virtual line P and the calibration line Q are stored in advance in the calculation control unit of the reflected light measurement device 1, and the connector C1 to be measured and the connector C2 to be measured are connected as illustrated in FIG. 1, and a defect site such as disconnection inside the connector C1 to be measured and the connector C2 to be measured is retrieved while varying the reference optical path length of the reference optical system as described above.

When the defect site such as disconnection is not found, it is regarded as a good product. In a case where the defect site is detected, a reflectance of a reflected light quantity is read with respect to an output voltage of interference light which is measured by the photometer 6 on the basis of the virtual line P or the calibration line Q, and the reflectance with respect to the measurement laser light L1 at the defect site is digitized and is output.

In addition, it is possible to guarantee that inspection has been made up to a reflectance of a certain extent of detect state to a user. For example, a manufacturer can guarantee that a defect state such as disconnection, for example, up to −80 dB as a limit measurement value of the reflected light measurement device 1 with respect to a connector to be sold is not found.

Example 3

FIG. 10 is a configuration diagram of a reflected light measurement device 1 of Example 3, and a connector C3 to be measured which is provided with an optical fiber cable FC is connected to the reflected light measurement device 1 through a connection unit 7. The reflected light measurement device 1 includes a laser light source 2, a beam splitter 3, a reference mirror 4, a photometer 6, a connection unit 7, an optical path switching unit 9, and an optical path length adjustment unit 10.

The connection unit 7 is disposed on an optical path of measurement laser light L1 transmitted through the beam splitter 3, the optical path switching unit 9 and the optical path length adjustment unit 10 are sequentially disposed between the beam splitter 3 and the connection unit 7.

For example, the optical fiber cable FC is set as a bundle of several to approximately 4,000 pieces of optical fibers FM1 to FMn, and the connector C3 to be measured is set to a mode capable of simultaneously connecting the optical fibers FM1 to FMn, for example, as in the MPO connector. In addition, the connector C3 to be measured can be connected to the connection unit 7.

For example, the optical path switching unit 9 is a commercially available optical switch, and includes an optical switch unit 9a that performs a switching process, and switching optical paths 9b1 to 9bn which can be connected to the optical switch unit 9a. The switching optical paths 9b1 to 9bn correspond to respective optical fibers FM1 to FMn of the optical fiber cable FC, and are disposed in the same number.

The optical switch unit 9a can switch an optical path of the measurement laser light L1 and L1′ to any one of the switching optical paths 9b1 to 9bn by switching control based on a switching command from a calculation control unit (not illustrated). For example, a variation of the optical path length of the switching optical paths 9b1 to 9bn is several millimeters to several centimeters.

In addition, when performing disconnection inspection, the optical path switching unit 9 is disposed so that the measurement laser light L1 is incident to the optical switch unit 9a. However, when constituting an optical path length of the optical path length adjustment unit 10 to be described later, the optical path switching unit 9 makes a change so that the measurement laser light L1 is incident to the switching optical paths 9b1 to 9bn which are reversed in a right and left direction. That is, the optical path switching unit 9 can be provided so that incident and emission are reversed with respect to the measurement laser light L1.

With regard to optical axis adjustment on the switching optical paths 9b1 to 9bn side of the optical path switching unit 9 when being attached so that the measurement laser light L1 is incident to the switching optical paths 9b1 to 9bn, a sliding unit capable of moving in a direction orthogonal to an optical axis of the optical path switching unit 9 may be provided so that each of the switching optical paths 9b1 and 9bn and the optical axis easily match each other. Alternatively, an optical path ranging from the beam splitter 3 to the optical path switching unit 9 may include an optical fiber, and connection with the optical path switching unit 9 may be performed with an optical connector provided at an end of the optical fiber.

The optical path length adjustment unit 10 includes adjustment optical paths 10a1 to 10an which respectively connect the optical fibers FM1 to FMn connected to the connector C3 to be measured and the switching optical paths 9b1 to 9bn of the optical path switching unit 9 in a one-to-one relationship through the connection unit 7. The adjustment optical paths 10a1 to 10an are adjusted so that a variation of an optical path length of the switching optical paths 9b1 to 9bn is eliminated, and total optical path lengths 9b1+10a1 to 9bn+10an of the optical path switching unit 9 and the optical path length adjustment unit 10 are equal to each other.

The laser light L emitted from the laser light source 2 is branched in the beam splitter 3, and the measurement laser light L1 that is transmitted through the beam splitter 3 and propagates straightly is transmitted to the connector C3 to be measured through the optical path switching unit 9, the optical path length adjustment unit 10, and the connection unit 7. For example, an optical path ranging from the beam splitter 3 to the optical path switching unit 9 is set as an optical fiber, and the optical switch unit 9a of the optical path switching unit 9 is connected to an end of the optical fiber. The measurement laser light L1 is transmitted through selective connection to one of the switching optical paths 9b1 to 9bn by the optical switch unit 9a of the optical path switching unit 9, passes through a corresponding one among the adjustment optical paths 10a1 to 10an of the optical path length adjustment unit 10, and reaches the connector C3 to be measured through the connection unit 7.

When a defect site such as disconnection exists inside the connector C3 to be measured, measurement laser light L1' reflected from defect sites D31 to D3n passes through the connection unit 7, the optical path length adjustment unit 10, and the optical path switching unit 9, is reflected by the beam splitter 3, and is received by the photometer 6.

On the other hand, a part of the laser light L is reflected by the beam splitter 3, becomes reference laser light L2, and is transmitted to the reference mirror 4. The reference mirror 4 includes an optical path length varying mechanism capable of moving to an arbitrary position along an optical axis of the reference laser light L2, and thus minute adjustment is applied to an optical path length of the reference laser light L2. The reference laser light L2 is reflected by the reference mirror 4 and becomes reference laser light L2', is transmitted through the beam splitter 3, and is received by the photometer 6.

Next, a method of detecting a position of an optical connector defect site by the reflected light measurement device 1 will be described with reference to a flowchart in FIG. 11. First, in step S201, the connector C3 to be measured as an optical connector on one end of the optical fiber cable FC for which defect inspection is to be performed is connected to the connection unit 7 having a connector shape. It is assumed that the switching optical path 9b1 is selected as an optical path of the measurement laser light L1 under switching control by the optical switch unit 9a of the optical path switching unit 9. Since the switching optical path 9b1 is selected, the optical path of the measurement laser light L1 becomes the defect site D31 of the connector C3 to be measured and the optical fiber FM1 through the adjustment optical path 10a1 and the connection unit 7.

Next, in step S202, the laser light L is emitted from the laser light source 2, and the laser light L is branched by the beam splitter 3 into the measurement laser light L1 toward the connector C3 to be measured and the reference laser light L2 toward the reference mirror 4 side.

In step S203, the reference mirror 4 is moved in a variable range along an optical axis to adjust a reference optical path length by the reference laser light L2. An adjustment range of the optical path length approximately corresponds to an optical distance from the connection unit 7 to the connector C3 to be measured. Due to movement of the reference mirror 4, when a measurement optical path length up to the defect site D31 inside the connector C3 to be measured by the measurement laser light L1, and a reference optical path length up to the reference mirror 4 by the reference laser light L2 match each other, a peak-shaped beat signal e by interference light received by the photometer 6 is obtained as illustrated in FIG. 3 in Example 1.

In step S204, it is determined whether or not the beat signal e is received by the photometer 6. When the defect site D31 does not exist inside the connector C3 to be measured, the measurement laser light L1 is not reflected and is not returned to the photometer 6, and is transmitted through the optical fiber FM1. When the peak-shaped beat signal e is not detected, the process transitions to step S205, and movement of the reference mirror 4 is stopped.

In step S206, a determination is made as to whether or not the subsequent switching optical path to be selected by the optical switch unit 9a exists, and in a case where the subsequent switching optical path does not exist, the process transitions to step S207, and measurement on all of the optical fibers FM1 to FMn of the optical fiber cable FC is completed. Since the connector C1 to be measured that is attached to the optical fiber cable FC that is an inspection target is normal, determination is made as a good product, and the inspection is terminated.

In step S206, in a case where the subsequent switching optical path to be selected by the optical switch unit 9a exists, the process transitions to step S208, and the subsequent switching optical path is selected. That is, in a case where a currently selected switching optical path is the switching optical path 9b1, switching to the switching optical path 9b2 is performed. When the switching optical path 9b2 is selected, the optical path of the measurement laser light L1 becomes the defect site D32 of the connector C3 to be measured and the optical fiber FM2 through the adjustment optical path 11a2 and the connection unit 7. In addition, the process returns to step S203, and the above-described interference light detection process is executed repetitively in the number of times corresponding to the number of the optical fibers FM1 to FMn of the optical fiber cable FC.

On the other hand, in step S204, in a case where the beat signal e is detected, it is determined that a disconnection defect due to the defect site D31 exists inside the connector C3 to be measured. In addition, the process transitions to step S209, movement of the reference mirror 4 is stopped, it is determined that the connector C3 to be measured which is attached to the optical fiber cable FC as an inspection target is a defective product, and the inspection is terminated.

Next, description will be given of a procedure of constructing the optical path length adjustment unit 10 so that the optical path length variation of the switching optical paths 9b1 to 9bn of the optical path switching unit 9 is eliminated in advance, and total optical path lengths 9b1+10a1 to 9bn to 10an of the optical path switching unit 9 and the optical path length adjustment unit 10 become equal to each other. FIG. 12 is a configuration diagram when detecting the optical path length variation of the switching optical paths 9b1 to 9bn, and the optical path length variation of the switching optical paths 9b1 to 9bn is detected through application of the process of detecting the beat signal e. The adjustment optical paths 10a1 to 10an of the optical path length adjustment unit 10 are constructed by using the detected optical path length variation of the switching optical paths 9b1 to 9bn so that the total optical path lengths 9b1+10a1 to 9bn to 10an of the optical path switching unit 9 and the optical path length adjustment unit 10 become equal to each other.

The optical path switching unit 9 changes an attachment direction from a state in which the optical switch unit 9a side of the optical path switching unit 9 illustrated in FIG. 10 is on an optical axis facing the beam splitter 3 to a state in which the switching optical paths 9b1 to 9bn side of the optical path switching unit 9 is on the optical axis facing the beam splitter 3.

In addition, when the measurement laser light L1 is incident to the switching optical path 9b1 after the optical switch unit 9a selects a switching optical path other than the switching optical path 9b1, a part of the measurement laser light L1 is reflected as the measurement laser light L1' due to a difference in a refractive index with the air at a tip end of the switching optical path 9b1, and is received by the photometer 6. At this time, when the optical path length of the reference laser light L2 is made to match an optical path length of the measurement laser light L1 by moving the reference mirror 4, a beat signal e due to interference light is obtained. A position of the reference mirror 4 at this time is stored in a calculation control unit. The above-described procedure is repetitively executed n times with respect to the switching optical paths 9b1 and 9bn.

As described above, a variation of the stored position of the reference mirror 4 with respect to the switching optical paths 9b1 to 9bn of the optical path switching unit 9 corresponds to a variation of the optical path length of the switching optical paths 9b1 to 9bn. Accordingly, the adjustment optical paths 10a1 to 10an of the optical path length adjustment unit 10 are formed from an optical path length adjustment member to correct the variation of the optical path length. That is, the optical path length adjustment unit 10 includes the optical path length adjustment member so that the total optical path lengths 9b1+10a1 to 9bn+10an of the switching optical paths 9b1 to 9bn of the optical path switching unit 9 and the adjustment optical paths 10a1 to 10an of the optical path length adjustment unit 10 become equal to each other. Note that, as the optical path length adjustment member used to form the adjustment optical paths 10a1 to 10an, an existing approximate optical member such as an optical fiber and a mirror can be used.

As described above, in a configuration in which the total optical path lengths of the adjustment optical paths 10a1 to 10an of the optical path length adjustment unit 10 and the switching optical paths 9b1 to 9bn of the optical path switching unit 9 which are connected to the adjustment optical paths become equal to each other, the optical path length of the measurement laser light L1 up to the connection unit 7 becomes constant even when passing through any of the switching optical paths 9b1 to 9bn. Accordingly, when adjusting the optical path length of the reference laser light L2 by only the optical path length of the connector C3 to be measured by moving the reference mirror 4, it is possible to obtain interference light corresponding to a position at which a defect such as disconnection occurs with respect to all of the defect sites D31 to D3n inside the connector C3 to be measured.

Note that, in a case where the optical path length variation of the switching optical paths 9b1 to 9bn reaches several centimeters, as the optical path length varying mechanism of the reference mirror 4 illustrated in FIG. 12, for example, a plurality of mirrors such as a retroreflector may be disposed to realize adjustment of an optical path length of several tens of centimeters, and the optical path length variation of the switching optical paths 9b1 to 9bn may be measured.

As described above, in the reflected light measurement device 1 of Example 3, since the optical path length variation of the optical path switching unit 9 is eliminated by the optical path length adjustment unit 10, it is necessary to move the reference mirror 4 only to an extent corresponding to an optical length of the connector C3 to be measured. Even in a case where the number of the optical fibers of the optical fiber cable FC is as many as several thousands, it is possible to complete disconnection inspection by quickly and reliably measuring reflected light.

Note that, inspection of the optical connection has been described as an example, but an inspection target is not limited to the optical connector. It is needless to say that use is applicable to a disconnection defect of the optical fiber, or defect inspection on various optical elements.

Example 4

FIG. 13 is a configuration diagram of a reflected light measurement device 1 of Example 4, and an optical connector attached to both ends of an optical fiber cable FC is set as an inspection target.

Connectors C4 and C5 to be measured in a mode of simultaneously connecting optical fibers FM1 to FMn as in the MPO connector are attached to both ends of the optical fiber cable FC as an inspection target. An optical path length of the optical fibers FM1 to FMn is constant.

In addition, an optical path length switching unit 5 that switches an optical path length of reference laser light L2 to a plurality of fixed lengths is disposed between a beam splitter 3 and a reference mirror 4. The optical path length switching unit 5 includes an optical switch 5a on both ends, and a plurality of fixed-length optical fibers 5b and 5c which are set to a predetermined optical path length in advance are respectively connected to connection terminals (not illustrated) of the optical switches 5a. The fixed-length optical fibers 5b and 5c includes a first fixed-length optical fiber 5b having an optical path length for the connector C4 to be measured on one end of the optical fiber cable FC, and a second fixed-length optical fiber 5c having an optical path length for the connector C5 to be measured on the other end, and are connected to the optical switches 5a in parallel.

That is, an optical path length of the first fixed-length optical fiber 5b is set to be approximately the same as an optical path length of measurement laser light L1 to a connection unit 7, and an optical path length of the second fixed-length optical fiber 5c is set to be approximately the same as a value obtained by adding the optical path length of the first fixed-length optical fiber 5b to an optical path length of the optical fibers FM1 to FMn.

In addition, in a case where the connector C5 to be measured is not an integral type, and connectors to be measured are individually connected along the optical path length of the optical fibers FM1 to FMn, a plurality of pieces of the second fixed-length optical fibers 5c having two or more kinds of optical path lengths corresponding to the individual connectors to be measured may be disposed. Alternatively, connection terminals (not illustrated) may be disposed on an outer surface of the reflected light measurement device 1, and the second fixed-length optical fiber 5c may be replaced during measurement in correspondence with the optical path length of the optical fibers FM1 to FMn. Note that, with regard to the first fixed-length optical fiber 5b, connection terminals may be disposed on the outer surface of the reflected light measurement device 1 in the same manner, and the first fixed-length optical fiber 5b may be appropriately replaced in correspondence with changing of an inspection target or the connection unit 7.

The other configurations of the reflected light measurement device 1 are the same as the configurations in Example 3, and thus descriptions thereof will be omitted. Example 4 configured as described above may employ a procedure that is approximately the same as in the flowchart illustrated in FIG. 11 as a method of detecting a position of an optical connector defect site in Example 3 as a method of detecting a position of a defect site. The method of detecting the position of the defect site in Example 4 is different from the method in Example 3 in that after inspection on the connector C4 to be measured on one end of the optical fibers FM1 to FM1 is completed, inspection on the connector C5 to be measured on the other end is performed.

First, when inspecting the connector C4 to be measured, the detection method illustrated in the flowchart in FIG. 11 is executed in a state in which the first fixed-length optical fiber 5b is selected by switching the optical switch 5a of the optical path length switching unit 5 in advance. Next, when inspecting the connector C5 to be measured, the detection method illustrated in the flowchart in FIG. 11 is executed in a state in which the second fixed-length optical fiber 5c is selected by switching the optical switch 5a of the optical path length switching unit 5 in advance.

As described above, it is possible to detect a position of defect sites D41 to D4n and D51 to D5n of the connectors C4 and C5 to be measured from a beat signal e due to interference light of the measurement laser light L1' and the reference laser light L2'.

Typically, the optical fiber cable FC has an optical path length as long as several meters or more, and thus it is difficult to make the reference optical path length match the measurement optical path length in a variable range of the reference mirror 4. However, when the optical path length switching unit 5 is provided, it is possible to make the reference optical path length approximately match the measurement optical path length. In addition, since the optical path length adjustment unit 10 eliminates the optical path length variation of several millimeters to several centimeters in the switching optical paths 9b1 to 9bn of the optical path switching unit 9, the measurement optical path length in the reflected light measurement device 1 becomes constant even when any of the switching optical paths 9b1 to 9bn is selected.

Accordingly, when performing minute adjustment of the reference optical path length by moving the reference mirror 4 in a range of approximately several tens of millimeters corresponding to the optical path length of the connectors C4 and C5 to be measured as an inspection target portion, it is possible to make the reference optical path length completely match the measurement optical path length.

As described above, since the reflected light measurement device 1 is provided with the adjustment unit that makes the reference optical path length and the measurement optical path length match each other, when the optical fiber cable FC is connected to the connection unit 7 at once, it is possible to quickly perform the disconnection inspection on the connectors C4 and C5 to be measured which are respectively attached to both ends of the optical fiber cable FC through a series of operations without particularly changing a connection state.

As described above, it is possible to continuously and effectively inspect a disconnection state of an optical connector to which an optical fiber cable including a plurality of optical fibers is connected by sequentially switching the optical fibers to be connected by an optical path switching unit without providing a large-sized optical path length adjustment mechanism for reference laser light in a reflected light measurement device.

REFERENCE SIGNS LIST

1 Reflected light measurement device
2 Laser light source
3 Beam splitter
4 Reference mirror
5 Optical path length switching unit
5a Optical switch
5b First fixed-length optical fiber
5c Second fixed-length optical fiber
6 Photometer
7 Connection unit
9 Optical path switching unit
9a Optical switch unit
9b1 to 9bn Switching optical path
10 Optical path length adjustment unit
10a1 to 10an Adjustment optical path
C1, C2, C11, C21, C1n, C2n, C3, C4, C5 Connector to be measured
FC Optical fiber cable
FM Optical fiber
PD Reference photometer
G Optical attenuator
S Reflection measurement device for calibration
M Reflection mirror

The invention claimed is:

1. A reflected light measurement device comprising:
a laser light source that emits laser light;
a beam splitter that branches the laser light into measurement laser light to be transmitted and reference laser light to be reflected;
a connection unit that is disposed on an optical path of the measurement laser light that is transmitted through the beam splitter;
a reference mirror including an optical path length varying mechanism capable of adjusting an optical path length of the reference laser light; and
a photometer that receives the measurement laser light reflected at a defect site of a material to be measured which is formed from a light-transmitting material, and the reference laser light reflected by the reference mirror through the beam splitter,
wherein the defect site is detected on the basis of interference light by the reference laser light and the measurement laser light which are received by the photometer, and
a switching unit that switches an optical path of the reference laser light is disposed between the beam splitter and the reference mirror, or an optical path switching unit that switches an optical path of the measurement laser light and an optical path length adjustment unit that is connected to the optical path switching unit and adjusts an optical path length of the optical path switching unit are disposed between the beam splitter and the connection unit.

2. The reflected light measurement device according to claim 1,
wherein the switching unit is an optical path length switching unit that switches a first fixed-length optical fiber having an optical path length for a connector to be measured on one end of an optical fiber, and a second fixed-length optical fiber having an optical path length for a connector to be measured on the other end of the optical fiber.

3. The reflected light measurement device according to claim 2,
wherein the optical path length switching unit includes an optical switch, and the first fixed-length optical fiber or the second fixed-length optical fiber is switched under switching control by the optical switch.

4. The reflected light measurement device according to claim 1,
wherein the material to be measured is an optical fiber inside a connector to be measured, and connects the connector to be measured to the connection unit.

5. The reflected light measurement device according to claim 1,
wherein the optical path switching unit is capable of being attached to make incidence and emission be reversed from each other with respect to the measurement laser light.

6. The reflected light measurement device according to claim 1,
wherein the optical path switching unit includes an optical switch unit that performs a switching process, and a plurality of switching optical paths capable of being connected to the optical switch unit,
the optical path length adjustment unit includes adjustment optical paths which are connected to the switching optical paths in a one-to-one relationship, and
total optical path lengths of the switching optical paths and the adjustment optical paths are equal to each other.

7. The reflected light measurement device according to claim 1,
wherein the material to be measured is a plurality of optical fibers inside a connector to be measured, and
the connector to be measured is connected to the connection unit.

8. The reflected light measurement device according to claim 1,
wherein an optical path length switching unit that switches the optical path of the reference laser is disposed between the beam splitter and the reference mirror.

9. The reflected light measurement device according to claim 8,
wherein the optical path length switching unit switches a first fixed-length optical fiber having an optical path length on one end side of the material to be measured, and a second fixed-length optical fiber having an optical path length on the other end side of the material to be measured.

10. The reflected light measurement device according to claim 1,
wherein a calculation control unit is connected to the reflected light measurement device, the calculation control unit storing a measurement value obtained in the photometer with respect to interference light by the measurement laser light obtained by attenuating incident light in a predetermined attenuation rate and the reference laser light, and a virtual line in which the predetermined attenuation rate is set as a reference point, and calculating and digitizing a reflectance corresponding to an attenuation rate that corresponds to the interference light on the basis of the virtual line in a case where the defect site inside the connector to be measured is detected on the basis of the interference light by the measurement laser light reflected at the defect site and the reference laser light.

11. The reflected light measurement device according to claim 10,
wherein the measurement value obtained in the photometer with respect to the interference light by the measurement laser light attenuated by fluctuating an optical attenuation rate, and the reference laser light, and the attenuation rate are set as a measurement point, and the virtual line is a line that passes through two or more points of the measurement points including the reference point.

12. The reflected light measurement device according to claim 10,
wherein in a case where a plurality of amplification circuits are used in a state of being connected in series, the calculation control unit stores a calibration line based on an average difference value from the virtual line with respect to the measurement value obtained by the photometer while fluctuating the attenuation rate of the optical attenuator in correspondence with the number of the plurality of amplification circuits, and
the calculation control unit calculates and digitizes the reflectance obtained from the virtual line or the calibration line that corresponds to the number of the amplification circuits with respect to a magnitude of the measurement value obtained by the photometer.

* * * * *